(12) United States Patent
Mociran

(10) Patent No.: US 11,549,246 B1
(45) Date of Patent: Jan. 10, 2023

(54) MAGNETICALLY ACTUATED POP-UP DRAIN ASSEMBLY

(71) Applicant: Vasile Mociran, Buffalo Grove, IL (US)

(72) Inventor: Vasile Mociran, Buffalo Grove, IL (US)

( * ) Notice: Subject to any disclaimer, the term of this patent is extended or adjusted under 35 U.S.C. 154(b) by 0 days.

(21) Appl. No.: 17/516,182

(22) Filed: Nov. 1, 2021

Related U.S. Application Data

(63) Continuation-in-part of application No. 16/728,131, filed on Dec. 27, 2019, now abandoned.

(51) Int. Cl.
| | | |
|---|---|---|
| *F16K 31/08* | (2006.01) | |
| *E03C 1/23* | (2006.01) | |
| *E03C 1/262* | (2006.01) | |
| *F16K 31/52* | (2006.01) | |
| *F16K 31/46* | (2006.01) | |

(52) U.S. Cl.
CPC ............ *E03C 1/2302* (2013.01); *E03C 1/262* (2013.01); *F16K 31/086* (2013.01); *E03C 2001/2311* (2013.01); *E03C 2001/2317* (2013.01); *F16K 31/465* (2013.01); *F16K 31/523* (2013.01)

(58) Field of Classification Search
CPC ...... F16K 31/08; F16K 31/084; F16K 31/086; F16K 31/46; E03C 1/182; E03C 1/186; E03C 1/2302; E03C 1/262; E03C 2001/2311; E03C 2001/2317; H01F 7/0236
See application file for complete search history.

(56) References Cited

U.S. PATENT DOCUMENTS

| | | | | | |
|---|---|---|---|---|---|
| 2,869,563 | A | * | 1/1959 | Schoengrun | ............ F16K 31/08 335/223 |
| 3,652,054 | A | * | 3/1972 | Layton | ................ F16K 31/0651 251/65 |
| 3,665,354 | A | * | 5/1972 | Werner | ................ B23Q 3/1546 335/304 |
| 5,208,921 | A | * | 5/1993 | Nicoll | ....................... E03C 1/23 4/689 |
| 5,230,365 | A | * | 7/1993 | Woltz | ....................... F16K 31/46 251/294 |
| 5,363,519 | A | * | 11/1994 | Husting | ..................... E03C 1/23 4/689 |
| 5,640,724 | A | * | 6/1997 | Holmes | ..................... A47K 1/14 4/689 |
| 5,758,863 | A | * | 6/1998 | Buffet | ................. F16K 31/3855 251/28 |

(Continued)

*Primary Examiner* — Matthew W Jellett
(74) *Attorney, Agent, or Firm* — Kenneth L Tolar

(57) ABSTRACT

A magnetically actuated pop-up drain assembly includes a tailpiece having an upper end, a lower end and a hollow interior. Axially received within the tailpiece interior is a plug including a dome-shaped cap with an elongated stem depending therefrom. Proximal a lower end of the stem are an upper magnet having a predetermined polarity and a lower spaced magnet having an opposite polarity. Slidably mounted on the outer surface of the tailpiece is an outer magnet having an upper pole identical to a lower pole of the upper magnet, and a lower pole identical to an upper pole of the lower magnet. Accordingly, upward movement of the outer magnet will repel the upper magnet and lift the stem. Conversely, downward movement will repel the lower magnet, which lowers the stem.

10 Claims, 2 Drawing Sheets

(56) References Cited

U.S. PATENT DOCUMENTS

| | | | | |
|---|---|---|---|---|
| 6,282,730 | B1* | 9/2001 | Duncan | F16K 31/465 |
| | | | | 4/295 |
| 6,484,330 | B2* | 11/2002 | Gray | E03C 1/2302 |
| | | | | 4/689 |
| 7,093,818 | B2* | 8/2006 | Koeneman | F16K 11/074 |
| | | | | 251/207 |
| 8,701,224 | B2* | 4/2014 | Li | E03C 1/2306 |
| | | | | 4/689 |
| 8,836,456 | B2* | 9/2014 | Tachikawa | H01H 1/06 |
| | | | | 335/196 |
| 9,427,114 | B2* | 8/2016 | Tong | E03C 1/2302 |
| 10,233,622 | B2* | 3/2019 | Ball | E03C 1/2302 |
| 10,538,903 | B2* | 1/2020 | Franzen | E03C 1/2302 |
| 2009/0255041 | A1* | 10/2009 | Duncan | E03C 1/2304 |
| | | | | 4/295 |
| 2010/0090138 | A1* | 4/2010 | Bromley | B67D 7/42 |
| | | | | 251/157 |

\* cited by examiner

MAGNETICALLY ACTUATED POP-UP DRAIN ASSEMBLY

CROSS REFERENCE TO RELATED APPLICATIONS

This application is a continuation-in-part of application of application Ser. No. 16/728,131 filed on Dec. 27, 2019.

BACKGROUND OF THE INVENTION

The present invention relates to a pop-up drain assembly having a magnetically actuated plug with a removable hair trap that prevents a drain line from clogging.

DESCRIPTION OF THE PRIOR ART

A conventional pop-up drain assembly typically includes a movable plug seated within a sink drain. A lifting rod on the sink moves a pivot rod that extends into the drain line and connects to the drain plug. The linkage between the drain plug and the pivot rod easily entraps hair, debris and other matter that routinely clog the drain line. The resulting decrease in water flow can also cause additional blockages downstream, such as in the P-trap or in the waste pipe. In order to remove any obstructions, a plumber or homeowner must dismantle piping and/or the drain plug assembly, which is laborious and time consuming.

Accordingly, there is currently a need for a drain plug that does not entrap waste products within a drain line. A review of the prior art reveals at least one magnetic drain stopper that is designed, in part, to prevent drain obstructions. U.S. Pat. No. 5,640,724 issued to Holmes discloses a drain plug having a magnet on its lower end and an external magnet surrounding a non-magnetic drain pipe. However, thought the device includes upper and lower magnetic stops for retaining the drain plug in either a lowered or raised position, it includes no means for varying the relative positioning of any of the magnets to adjust the range within which the plug can be raised and lowered. Furthermore, the device includes no means for preventing air and other debris from contacting and impeding operation of the magnets.

The present invention overcomes the deficiencies of the prior art by providing a pop-up drain assembly that uses cooperating internal and external magnets to raise and lower a plug, eliminating the need for an internally connected pivot rod. Furthermore, the device includes an adjustable stop member for varying the range within which the plug can be raised and lowered, and a spring-biased plunger mechanism that locks a lifting rod in either of a raised or lowered position. Finally, the present invention includes a removable filter that prevents hair and debris from clogging the drain or impeding the magnets.

SUMMARY OF THE INVENTION

The present invention relates to a magnetically actuated pop-up drain assembly comprising a tailpiece having an upper end, a lower end and a hollow interior. Axially received within the tailpiece interior is a plug including a dome-shaped cap with an elongated stem depending therefrom. Proximal a lower end of the stem are an upper magnet having a predetermined polarity and a lower magnet having an opposite polarity. Slidably mounted on the outer surface of the tailpiece is an outer magnet having an upper pole identical to a lower pole of the upper magnet, and a lower pole identical to an upper pole of the lower magnet. Accordingly, upward movement of the outer magnet will repel the upper magnet and lift the stem. Conversely, downward movement of the outer magnet will repel the lower magnet and lower the stem.

It is therefore an object of the present invention to provide a drain assembly with a magnetically actuated plug.

It is therefore another object of the present invention to provide a drain plug that is magnetically raised and lowered within a predefined range by a slidable outer magnet.

It is yet another object of the present invention to provide a drain plug having a spring-biased lifting mechanism that remains in either a lowered or raised position when released.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
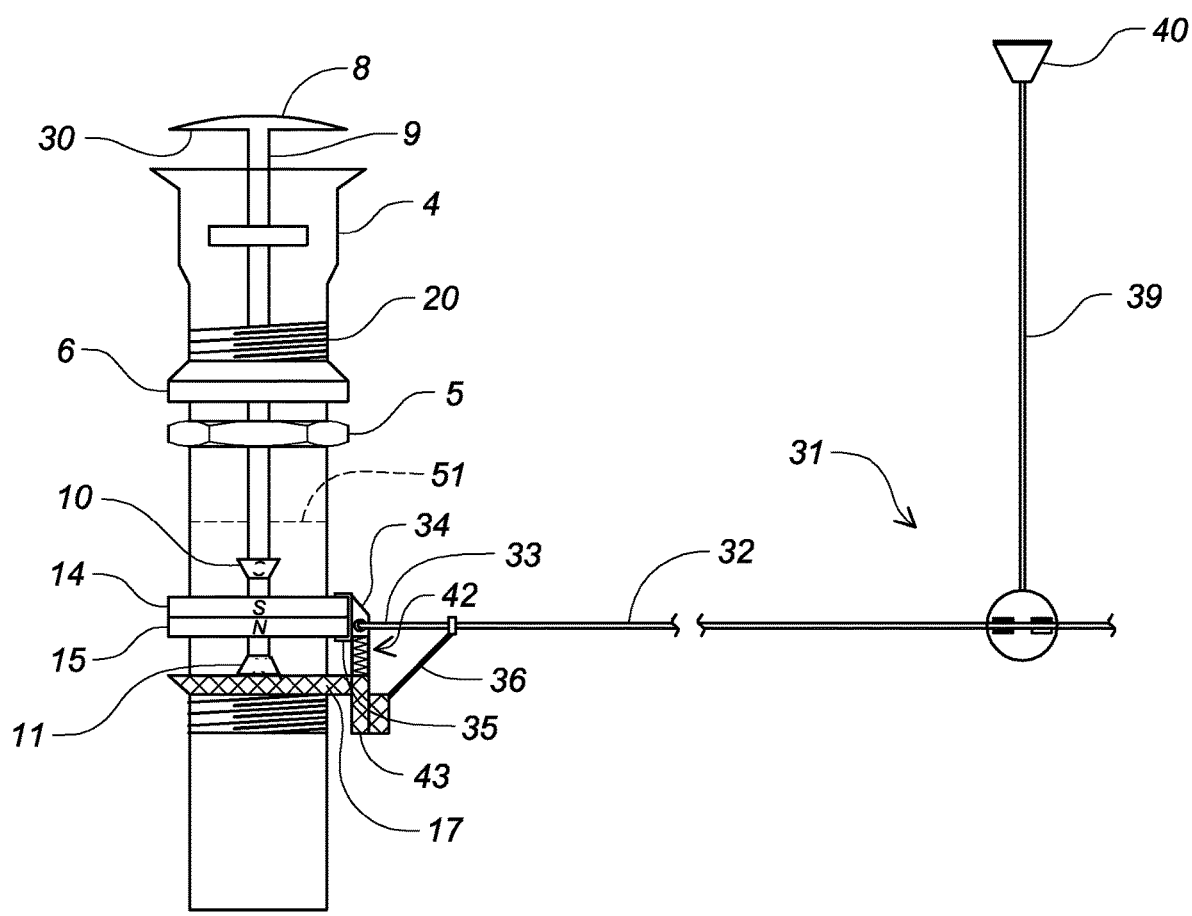
FIG. 1 is a plan view of the popup drain assembly according to the present invention.
Figure 2:
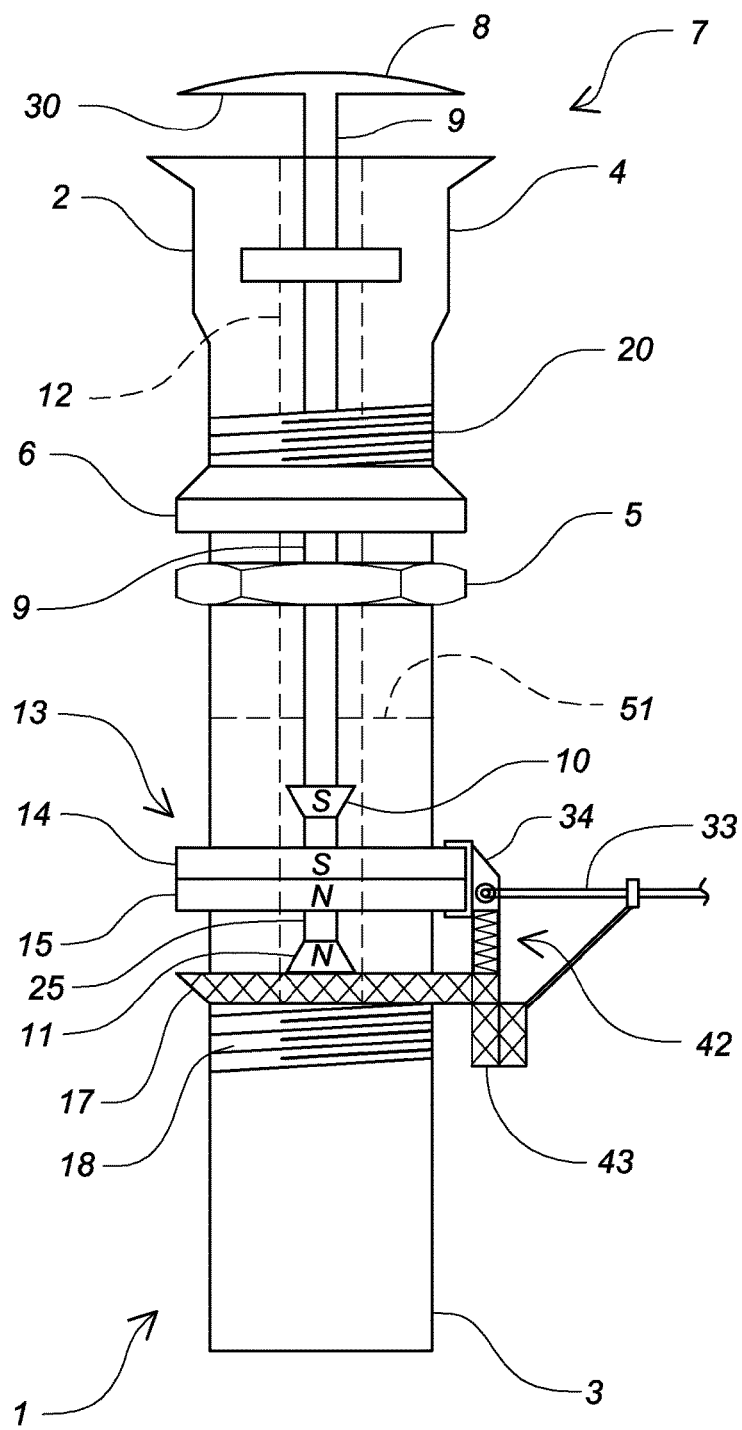
FIG. 2 is an isolated view of the tailpiece and associated components.
Figure 3:
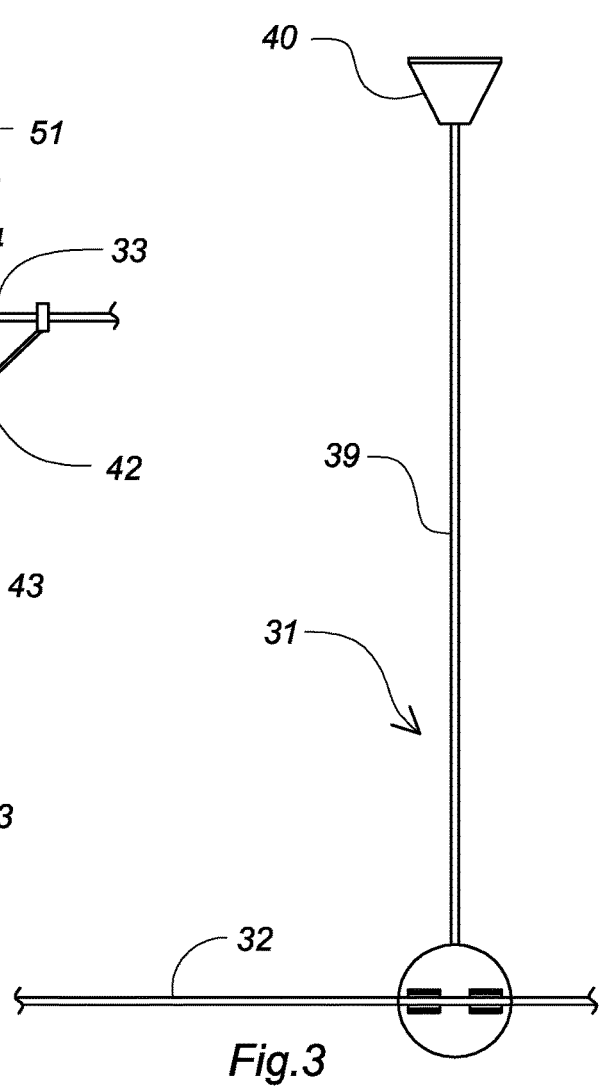
FIG. 3 is an isolated view of the lifting mechanism.

The present invention relates to a magnetically actuated pop-up drain assembly comprising a tailpiece 1 having an upper end 2, a lower end 3 and a hollow interior. The upper end includes a flange 4 that is dimensioned and configured to seat within a drain opening in a given sink basin. A lock nut 5 positioned on a threaded portion 20 at the upper end of the tailpiece locks a frustoconical gasket 6 against the lower surface of the flange.

Axially received within the tailpiece interior is a plug 7 including a dome-shaped cap 8 with an elongated stem 9 depending therefrom. The lower surface of the cap 8 includes seal 30 that prevents water seepage through the drain opening when the cap 8 is resting thereon. Proximal a lower end 25 of the stem are a pair of spaced, interior magnets, specifically, an upper magnet 10 having a predetermined polarity and a lower magnet 11 having an opposite polarity. The stem 9 is received within an elongated, tubular shroud 12 that protects the magnets from water abrasion and corrosion. A removable hair trap 51 prevents debris from clogging the tailpiece or hindering the movement or effectiveness of the magnets 10, 11.

Slidably mounted on the outer surface of the tailpiece is an outer magnet 13 having an upper pole 14 identical to the lower pole of the upper magnet 10, and a lower pole 15 identical to the upper pole of the lower magnet 15. Accordingly, upward movement of the outer magnet will repel the upper magnet and lift the stem. Conversely, downward movement will repel the lower magnet and lower the stem and the plug.

A lower 17 stop member allows a user to limit the degree to which the outer magnet 13 is raised or lowered. Attached to the lower stop member 17 is a spring-biased actuator 42 including a receiver 43 with a plunger 34 received therein. When the plunger is depressed, it remains in a retracted, lowered position. When the plunger is depressed again, it returns to an extended, raised position.

An external lifting mechanism 31 accessible on the sink basin allows a user to lift and lower the outer magnet in a similar fashion as with a conventional drain plug assembly. The lifting mechanism 31 includes a horizontal pivot rod 32 having first 33 and second 38 opposing ends. The first end 33 is pivotally coupled with the plunger 34, which carries a platform 35 that rests beneath the outer magnet 13. The pivot rod 32 is supported on an angled fulcrum 36 that is affixed to the lower stop member 17. Pivotally connected to the second end 38 of the pivot rod 32 is a vertical lifting rod 39 having a handle 40 at an upper distal end that is positioned on the sink basin. Accordingly, raising the lifting rod will depress the plunger 34 to a retracted position to lower the magnet 13, thereby lowering the cap 8 and seal 30 into the drain opening. The spring-biased actuator retains the lifting rod in the retracted position until the lifting the rod is further manipulated. Raising the lifting rod a second time will release the plunger to an extended position, thereby lifting the outer magnet 13 and raising the cap above the drain opening, allowing the sink to drain.

As is readily apparent from the detailed description above, the present invention provides a unique popup drain assembly that will not create clogs in a tailpiece. Because there is no internal linkage between a pivot rod and a plug stem as with conventional drain assemblies, waste materials will not be entrapped within the tailpiece and no leaks at the connection point will occur. However, in the rare event a clog occurs, the plug can be easily removed and cleaned. Furthermore, a hair trap and similar preventive mechanisms can be easily attached to the stem.

The above-described device is not limited to the exact details of construction and enumeration of parts provided herein. For example, the upper and lower magnets 10, 11 could be radial, homopolar, or axial magnets in lieu of conventional magnets. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A magnetically actuated pop-up drain assembly comprising:
    a tailpiece having an upper end, a lower end, a hollow interior and an outer surface, said upper end seating within a drain opening in a sink basin;
    a plug axially received within the hollow interior of said tailpiece, said plug including a cap with an elongated stem depending therefrom;
    an upper magnet and a lower spaced magnet proximal a lower end of the stem, said upper magnet having a predetermined polarity, said lower magnet having a polarity opposite said predetermined polarity;
    an outer magnet slidably mounted on the outer surface of said tailpiece, said outer magnet having an upper pole identical to a lower pole of the upper magnet, and a lower pole identical to an upper pole of the lower magnet;
    an external lifting mechanism connected to said outer magnet for raising and lowering said outer magnet whereby upward movement of the outer magnet repels the upper magnet and lifts the stem, and downward movement of the outer magnet repels the lower magnet and lowers the stem.

2. The magnetically actuated pop-up drain assembly according to claim 1 further comprising:
    a lower stop member on the outer surface of said tailpiece that allows a user to vary the degree to which the outer magnet is lowered.

3. The magnetically actuated pop-up drain assembly according to claim 2 wherein said lower stop member is adjustably mounted on said tailpiece.

4. The magnetically actuated pop-up drain assembly according to claim 1 wherein the upper end of said tailpiece includes a flange that is dimensioned and configured to seat within a drain opening in a given sink basin.

5. The magnetically actuated pop-up drain assembly according to claim 4 further comprising a lock nut positioned on a threaded portion at the upper end of the tailpiece that locks a frustoconical gasket against the lower surface of the flange.

6. The magnetically actuated pop-up drain assembly according to claim 1 wherein said stem is received within an elongated, tubular shroud that protects the upper magnet and the lower magnet from water abrasion and corrosion.

7. The magnetically actuated pop-up drain assembly according to claim 2 wherein said external lifting mechanism comprises a spring-biased actuator attached to the lower stop member, said actuator including a receiver with a plunger received therein, said plunger connected to said outer magnet whereby when said plunger is depressed, said plunger remains in a retracted, lowered position and when said plunger is depressed again, said plunger returns to an extended, raised position.

8. The magnetically actuated pop-up drain assembly according to claim 7 wherein said external lifting mechanism further comprises a horizontal pivot rod having a first end and a second opposing end, said first end pivotally coupled with said plunger.

9. The magnetically actuated pop-up drain assembly according to claim 8 wherein the second end of said horizontal pivot rod is pivotally connected to a vertical lifting rod having a handle at an upper distal end that is positioned on a sink basin whereby raising the lifting rod depresses the plunger to a retracted position to lower the outer magnet, thereby lowering the cap into a drain opening, and raising the lifting rod a second time releases said plunger to an extended position, thereby lifting the outer magnet and raising the cap above the drain opening, allowing the sink to drain.

10. The magnetically actuated pop-up drain assembly according to claim 1 further comprising a hair trap received within the hollow interior of said tailpiece that prevents debris from clogging said tailpiece and hindering movement and effectiveness of said upper magnet and said lower magnet.

\* \* \* \* \*